UNITED STATES PATENT OFFICE.

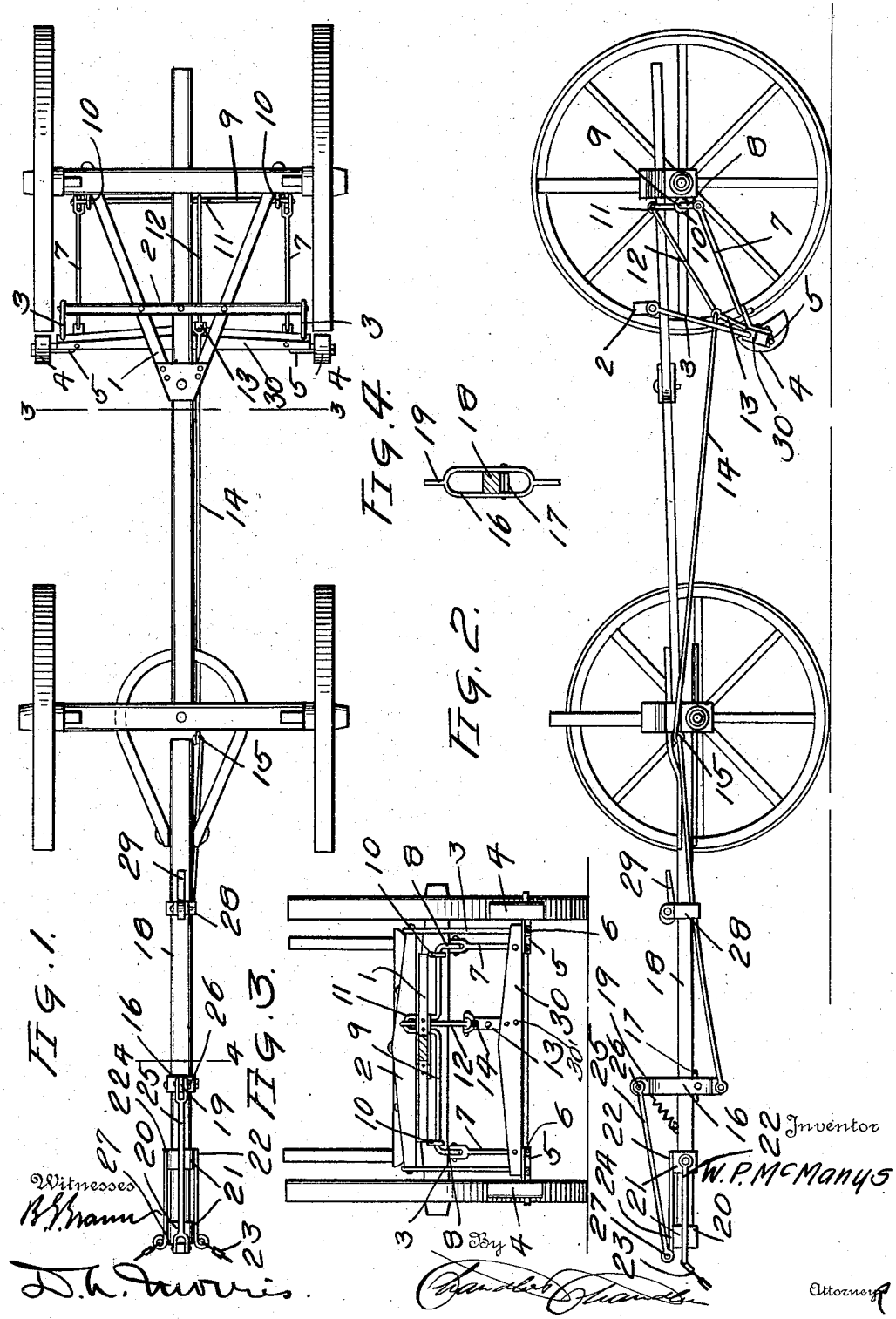

WILLIAM P. McMANUS, OF TAXAHAW, SOUTH CAROLINA.

WAGON-BRAKE.

1,187,076.　　　　　Specification of Letters Patent.　　Patented June 13, 1916.

Application filed June 14, 1915. Serial No. 34,026.

*To all whom it may concern:*

Be it known that I, WILLIAM P. MC-MANUS, a citizen of the United States, residing at Taxahaw, in the county of Lancaster, State of South Carolina, have invented certain new and useful Improvements in Wagon-Brakes; and I do hereby declare the following to be a full, clear, and exact description of the invention, such as will enable others skilled in the art to which it appertains to make and use the same.

This invention relates to a wagon brake.

An object of the invention resides in the provision of a brake which will be applied by the horses when going down hill.

A further object of the invention resides in so constructing the device that the brake may be rendered inoperative so that it will not be applied when the wagon is being backed.

A still further object of the invention resides in the provision of a device which is simple in construction and which may be readily applied to a vehicle.

With these and other objects in view, such as will appear as the description progresses, my invention comprises the combination and arrangement of parts as set forth in and falling within the scope of the appended claim.

Referring to the drawing: Figure 1 is a side elevation of my device. Fig. 2 is a plan view thereof. Fig. 3 is a section on line 3—3 of Fig. 2. Fig. 4 is a section on line 4—4 of Fig. 2.

Referring to the drawing wherein like parts are indicated by like characters throughout the several views:—In the drawings I have illustrated the running gear of a wagon, conventionally. Mounted on the hound 1 is a beam 2 which extends transversely thereof. Depending from this beam is a pair of rods 3 on the lower ends of which brake shoes 4 are secured, the said shoes being mounted on suitable arms 5 which are secured to the rods 3 by nuts 6. Secured to the inner ends of these arms 5 are links 7 which extend rearwardly and are pivotally secured to crank portions 8 of a shaft 9, which shaft is rotatably mounted in bearing members 10 secured to the rear axle of the wagon. When this shaft 9 is rotated the shoes 4 will be caused to bear against the rear wheels of the wagon and thus retard the movement thereof. In order that this shaft 9 may be partially rotated by the horses when the wagon or vehicle is going down hill, I have provided a crank portion 11 between the ends of the shaft 9. Pivotally secured to this crank portion 11 is a link 12 which is, at its other end, secured to a connecting member 13, which is secured to the brace 30 by bolts 30'. Secured to this connecting member, pivotally, is a rod 14 which extends forwardly beneath the hound 1 and is jointed, as at 15, beneath the front axle. The forward end of this rod 14 is bifurcated and pivotally connected to the lower end of a lever 16 which is mounted on a bearing 17 secured to the under side of the tongue 18 of the vehicle. This lever 16 is bifurcated with one of the resulting legs extending upwardly on each side of the tongue and secured together at their upper ends to form a shank 19.

Mounted upon the forward end of the tongue 18 is a slide 20 which comprises a pair of spaced collars 21 embracing the tongue and held in spaced relation by bars 22 which are slightly extended at their forward ends for the reception of the hame chains 23. A third bar 24 is mounted on this slide. Connecting the forward end of this bar 24 is a link 25 which is bifurcated at both of its ends. The legs at the rear end straddle the shank 19 and are pivoted thereto by a suitable bolt 26, while the legs at the forward end thereof straddle the forward end of the bar 24 and are pivoted thereto by a bolt 27. Encircling the tongue 18 and the rod 14 is a keeper 28 which is loosely mounted on the tongue and has a cam 29 pivoted thereto, which cam is located on the upper face of the tongue. A brace 30 extends between the arms 5 to hold them in their proper positions.

In using the device the chains 23 are secured to the hames of the horses in any convenient manner and when the vehicle is being drawn on flat ground or up hill the brake will be ineffective. When the vehicle is going down hill, however, it rides slightly up on the horses. This action will cause the slide 20 to move on the tongue 18 which, through the link 25, will cause the upper end of the lever 16 to move rearwardly and consequently throw the lower end forwardly. This will in turn draw the crank portion 11 of the shaft 9 forwardly and cause the brake shoes 4 to grip the rear wheels. The vehicle will thus be retarded.

The joint 15 between the two portions of the rod 14 will allow the front wheels to turn. The parts are returned to their inoperative positions by a spring 31 which is secured to the tongue 18 and the lever 16.

When it is desired to render the brake inoperative the cam 29 may be thrown so as to draw the keeper 28 tightly into engagement with the rod 14. This action will bind the rod upon the tongue 18 and thus will prevent the movement of the parts of the brake.

From the foregoing description it will be seen that I have provided a brake which will be applied when the vehicle is going down hill, automatically, I have furthermore provided means for rendering the brake inoperative.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

In a vehicle brake, the combination with a running gear of a vehicle, of a beam extending transversely of the hound thereof, rods depending from the ends of said beam, brake shoes mounted on the ends of said rods, a brace member extending between said shoes, a shaft mounted on the rear axle, links connecting said shaft and said brace, a connecting member mounted on the brace, a link secured to the connecting member and to the shaft, a rod secured to the connecting member and extending forwardly, a slide mounted on the tongue of the running gear and means connecting the rod to the slide for moving the rod forwardly upon the rearward movement of the slide.

In testimony whereof, I affix my signature, in the presence of two witnesses.

WILLIAM P. McMANUS.

Witnesses:
 GEO. C. McMANUS,
 B. F. HUNTER.

Copies of this patent may be obtained for five cents each, by addressing the "Commissioner of Patents, Washington, D. C."